United States Patent [19]

Anderson et al.

[11] 4,278,479

[45] Jul. 14, 1981

[54] ORGANIC ACID ACTIVATED LIQUID SOLDER FLUX

[75] Inventors: Edward A. Anderson, Yorba Linda; Rose M. Rawls; James A. Tull, both of Los Angeles, all of Calif.

[73] Assignee: Hughes Aircraft Company, Culver City, Calif.

[21] Appl. No.: 160,716

[22] Filed: Jun. 18, 1980

[51] Int. Cl.³ .............................................. B23K 35/34
[52] U.S. Cl. ................................................... 148/23
[58] Field of Search ........................................ 148/23-25

[56] References Cited

U.S. PATENT DOCUMENTS

| 3,832,242 | 8/1974 | Cuthbert | 148/23 |
|---|---|---|---|
| 3,837,932 | 9/1974 | Aronberg | 148/23 |
| 3,895,973 | 7/1975 | Stayner | 148/23 |
| 3,944,123 | 3/1976 | Jacobs | 148/23 |
| 4,113,525 | 9/1978 | Stayner | 148/23 |
| 4,140,554 | 2/1979 | Stayner | 148/23 |
| 4,216,035 | 8/1980 | Bakos | 148/23 |

*Primary Examiner*—P. D. Rosenberg
*Attorney, Agent, or Firm*—D. W. Collins; W. H. MacAllister

[57] ABSTRACT

An improved organic acid activated liquid solder flux is provided by combining a carboxylic acid derivative of a condensed nuclear hydrocarbon, such as 1-naphthylacetic acid, with a flux base, such as rosin, and a solvent, such as isopropyl alcohol. Application of this mixture to solder joints to be made results in faster solder reflow and easier removal of flux residue than with a flux of substantially the same composition not employing the carboxylic acid. Any residues remaining are non-corrosive.

8 Claims, No Drawings

ORGANIC ACID ACTIVATED LIQUID SOLDER FLUX

BACKGROUND OF THE INVENTION

1. Field of the Invention

This invention is directed to a liquid solder flux, and, more particularly, to an organic acid activated liquid solder flux particularly useful in the electrical and electronics industries.

2. Description of the Prior Art

Soldering with a soft solder, i.e., a tin-lead based alloy melting at below 400° C., is widely employed in the electrical and electronics industries, for example, in the assembly of printed circuits, electronic components and conductors. In order to produce a satisfactory soldered joint, it is necessary to use a flux with the soft solder in order to remove any residual surface oxide films and hence provide a clean surface and in order to reduce the surface tension of the molten solder and hence promote good wetting of the surface by the solder. Fluxes for soft soldering are classified as corrosive, intermediate, or non-corrosive. It is normally essential in the electronics industry to use a flux which is non-corrosive, i.e., a flux which after use in a soldering operation yields a residue which is substantially inert and hence will not appreciably corrode the soldered joint, particularly under humid conditions. Non-corrosive fluxes are conventionally natural rosin-based fluxes comprising wood rosin and gum (or water-white gum) rosin. Rosin principally comprises a mixture of rosin acids, the major component of which is an abietic acid. The rosin flux may contain a small amount of an additive, generally known as an activating agent, which will improve the fluxing action of the rosin. Such rosin fluxes may be incorporated as a core or cores in solder wires, or may be used in the form of solutions or pastes.

The ingredients of an activated rosin increase the reaction to metal oxides and make wetting by the solder easier and faster. Ideally, any residue of the activating agent boils off with the heat of soldering, and what remains is solidified rosin, which is non-corrosive and non-conducting.

In certain critical electronic assemblies, use of commercial fluxes has resulted in hardware damage (e.g., lifted pads on printed wiring boards and corroded connectors). Work continues in an effort to develop suitable fluxes that permit making a solder joint faster and better with less hardware damage, consistent with minimal corrosivity of the hardware.

SUMMARY OF THE INVENTION

In accordance with the invention, an organic acid activated liquid solder flux comprising a flux base and an organic acid activator dissolved in sufficient solvent to form a liquid solder flux is provided. The organic acid activator consists essentially of carboxylic acid derivative of a condensed nuclear hydrocarbon. The amount of the organic acid activator ranges from an amount effective to provide improved fluxing action to an amount sufficient to form a saturated solution.

When the flux of the invention is applied to solder joints to be made, solder reflow (or surface tinning-lead tinning) is achieved faster (that is, the solder iron tip is on and off the joint faster) and flux residue is removed easier than with comparable fluxes not employing the organic acid activator.

DETAILED DESCRIPTION OF THE INVENTION

It is contemplated that the solder flux of the invention will find use in the electrical and electronics industries for making electrical connections. In such applications, it is preferred that the fluxes leave no residues upon soldering or, if residues remain, that these residues either be easily removable in solvent or be non-corrosive and avoid interfering with the electrical operation of the soldered components.

The improved solder flux of the invention comprises a flux base and an organic acid activator dissolved in sufficient solvent to form a liquid solder flux.

Flux bases suitable in the practice of the invention are those non-halogenated materials, the residue of which, if remaining, prevents or minimizes moisture transport therethrough. Examples include rosins, waxes, shellacs and the like as well as polymer-based materials such as acrylics and urethanes. Preferably, rosin, especially that rosin know as water-white gum rosin, is employed, since it aids in coagulating and suspending loosened metal oxides.

The solvent employed to form the liquid solder flux is one which is a convenient vehicle for the flux base and acid activator, yet vaporizes readily during soldering, leaving no corrosive residues. For rosin-base fluxes, an example of a suitable solvent includes an aliphatic alcohol such as isopropyl alcohol.

The organic acid activator employed in the invention consists essentially of at least one carboxylic acid derivative of a condensed nuclear hydrocarbon. The carboxylic acid derivative may be mono or of higher order. Condensed nuclear hydrocarbon compounds are compounds in which two or more carbon atoms are shared in common by two or more aromatic rings. Examples of such compounds include naphthalene and anthracene and their derivatives. Preferably, 1-naphthylacetic acid is employed as the organic acid activator.

The amount of the organic acid activator in the liquid solder flux ranges from an amount effective to provide improved fluxing action to an amount sufficient to form a saturated solution. In the case of a liquid solder flux comprising rosin/isopropyl alcohol/1-naphthylacetic acid, the organic acid activator ranges from about 0.18 to 19 weight percent of the flux, the balance, the rosin-/alcohol solution comprising about 40 weight percent rosin and about 60 weight percent alcohol. Preferably, the amount of organic acid activator ranges from about 0.18 to 0.75 weight percent in order to pass the water extract test for RMA (Rosin-Mildly Activated) fluxes. This test, set forth in Military Specification MIL-F-14256, requires that the specific resistivity of a water extract of the flux be at least 100,000 ohm-cm for RMA fluxes.

The flux of the invention is suitably prepared by mixing the components in the desired proportions. Following soldering, any remaining residues are easily removed, such as by solvent wiping with alcohol or vapor degreasing with various perfluorinated solvents; any residues still remaining are substantially non-corrosive.

When soldering printed wiring boards (PWBs) and connections employing a commercial solder flux comprising rosin, isopropyl alcohol and triethanolamine hydrochloride, hardware damage such as lifted PWB pads and corrosion (intermittant signals through connectors) is experienced. However, employing a solder flux comprising rosin, isopropyl alcohol and an organic acid activator consisting essentially of 1-naphthylactic acid, results in reduced hardware damage. Further, solder reflow is achieved faster and flux residue is more easily removed than with the commercial flux.

EXAMPLES

A comparison was made between a commercial flux comprising 62.05 weight percent isopropyl alcohol, 37.8 weight percent rosin and 0.15 weight percent triethanolamine hydrochloride (control flux) with a second commercial flux having substantially the same proportion of isopropyl alcohol to rosin but without the triethanolamine hydrochloride, to which had been added 1-naphthylacetic acid in a ratio to 10 g acid in 60 ml (53.5 g) roson/alcohol (flux of the invention).

Comparison tests were performed to evaluate the fluxes. These were spread factor, solder pool and copper mirror, which were based on Military Specification MIL-F-14256, "Liquid Soldering Flux". In addition, several different type components were soldered to printed wiring boards (PWBs) using each flux to evaluate solderability. The assemblies were tested for moisture resistance to evaluate the corrosivity of each flux residue.

The spread factor test was used to evaluate the fluxing action of the fluxes. The initial test procedure was followed as specified in MIL-F-14256, except that the copper coupons were 0.064×1.5 inch instead of 0.005×1.4×1.4 inch. The solder pool test was used to evaluate fluxing action and was performed as specified in MIL-F-14256. The copper mirror test was used to evaluate the corrosivity of the flux materials on copper and was performed as specified in MIL-F-14256. The PWB test evaluated both the solderability of several different components using the fluxes and corrosivity of the flux residue. Two PBW's containing resistors with tin-plated copper leads, transistors with gold-plated Kovar leads and dual-in-line packages with tin plated iron-nickel leads were soldered using each flux. One PWB assembly for each flux was cleaned to remove flux and flux residues by vapor degreasing using FREON TE (FREON is a trade name of E. I. duPont de Nemours, Wilmington, Del.), while the other was left in the as-soldered condition with the flux residue on the PWB. The PWBs were then tested for moisture resistance per MIL-STD-202, Method 106, for seven days. Following the moisture resistance testing, the PWBs were inspected for evidence of corrosion and each component lead was inspected for solder wetting.

The fluxes from the spread factor test were ranked visually on their ability to promote solder wetting on the surface of the oxidized copper coupon. The control flux evidenced a fair result, while the flux of the invention evidenced a good result. The fluxes in the solder pool test were ranked visually on their ability to promote the spreading of the molten solder over the clean copper surface. The control flux was ranked fair, while the flux of the invention was ranked excellent. The fluxes in the copper mirror test were ranked visually based on the amount of copper film removed from the test slide. The control flux ranked fair, while the flux of the invention rated superior.

The PWBs were visually inspected using 10X magnification for evidence of corrosion and for component lead solder wetting. The fluxes were ranked based on the amount of corrosion detected on each board, the solder wetting of the component leads and the ease of flux removable by vapor degreasing after soldering. The PWBs were soldered using a 700° F. iron and then exposed to the humidity testing. The control flux evidenced excellent corrosion resistance, fair lead wetting and excellent flux removal, while the flux of the invention evidenced excellent corrosion resistance, poor lead wetting and excellent flux removal. There was no corrosion visible resulting from use of either the control flux or the flux of the invention. Overall, the flux of the invention was considered to be superior to the control flux.

In another set of experiments, the following solder flux solutions were prepared, employing 1-naphtylacetic acid in the rosin/alcohol solution mentioned above: 0.1 g acid/60 ml rosin/alcohol; 1.0 g acid/60 ml rosin/alcohol; and 0.4 g acid/50 ml rosin/alcohol. In soldering components to PWBs, the foregoing solder fluxes evidenced good solder flow and rapid response to heat. The solder joints were shiny, indicating that no cold solder joints had been formed.

What is claimed is:

1. An improved solder flux comprising a flux base and an organic acid activator dissolved in sufficient solvent to form a liquid solder flux, characterized in that the organic acid activator consists essentially of a carboxylic acid derivative of a condensed nuclear hydrocarbon.

2. The solder flux of claim 1 in which the flux base consists essentially of a white water rosin.

3. The solder flux of claim 1 in which the solvent consists essentially of an aliphatic alcohol.

4. The solder flux of claim 3 in which the solvent consists essentially of isopropyl alcohol.

5. The solder flux of claim 1 in which the organic acid activator consists essentially of 1-naphthylacetic acid.

6. The solder flux of claim 1 in which the amount of organic acid activator ranges from an amount effective to provide improved fluxing action to an amount sufficient to form a saturated solution.

7. The flux of claim 1 comprising about 0.18 to 19 weight percent of 1-naphthylacetic acid, the balance a rosin/alcohol solution comprising about 40 weight percent rosin and about 60 weight percent isopropyl alcohol.

8. The flux of claim 7 in which the acid ranges from about 0.18 to 0.75 weight percent.

* * * * *

UNITED STATES PATENT OFFICE
CERTIFICATE OF CORRECTION

PATENT NO. : 4,278,479
DATED : July 14, 1981
INVENTOR(S) : Edward A. Anderson; Rose M. Rawls; James A. Tull It is certified that error appears in the above-identified patent and that said Letters Patent are hereby corrected as shown below:

Column 1, line 31, "or" instead of "and".
Column 2, line 21, "known" instead of "know".
Column 2, line 67, "intermittent" instead of "intermittant".
Column 3, line 15, "of" instead of "to".
Column 3, line 16, "rosin" instead of "roson".
Column 3, line 29, insert "x 1.5" following "0.064 x 1.5".
Column 3, line 37, "PWBs" instead of "PBW's".
Column 4, line 26, "60ml" instead of "50ml".
Column 4, line 39, "water-white" instead of "white water".

Signed and Sealed this

Twentieth Day of October 1981

[SEAL]

Attest:

Attesting Officer

GERALD J. MOSSINGHOFF

Commissioner of Patents and Trademarks